April 29, 1952  J. A. RIORDAN  2,594,587
BEARING
Filed Nov. 18, 1946
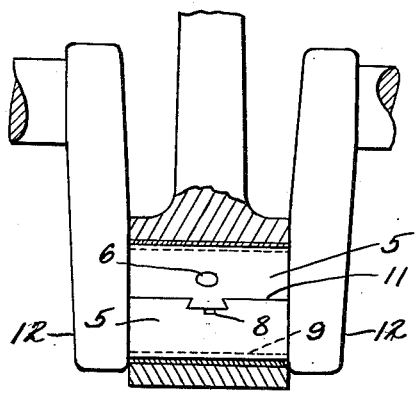
Fig.1.
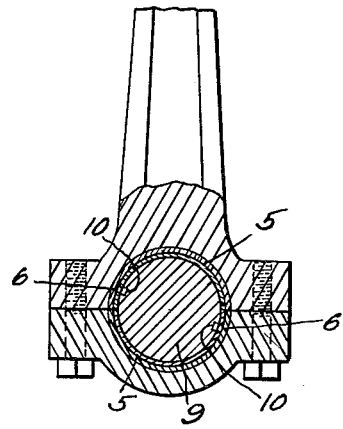
Fig.2.
Fig.3.
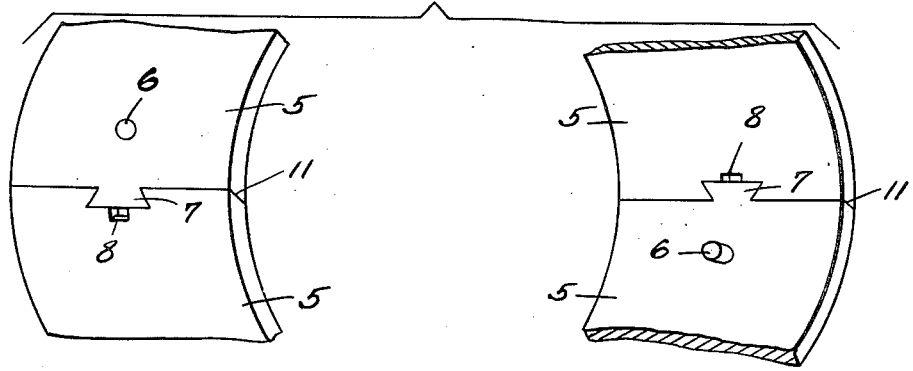
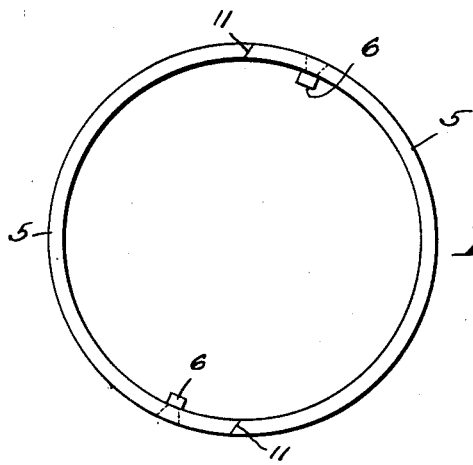
Fig.4.
J. A. Riordan
INVENTOR
BY Knowles
ATTORNEYS Patented Apr. 29, 1952

2,594,587

UNITED STATES PATENT OFFICE 2,594,587

BEARING

John A. Riordan, Kermit, Tex.

Application November 18, 1946, Serial No. 710,672

1 Claim. (Cl. 308—237)

This invention relates to improvements in journals and in particular, replaceable sleeves for crank shafts, wrist pins, and the like.

An important object of the invention is to provide a replaceable sleeve which can be readily assembled, mounted on and removed from the journal, with a minimum of time, labor, and expense, and which will by its construction and manner of using permit renewal of the journal surface without the necessity of repair, removal, or replacement of the crank shaft, wrist pins, or other member on which it is mounted.

Another important object of the invention is to provide a removable sleeve which will fulfill all of the functional requirements of such devices and will yet be capable of being constructed inexpensively and with a minimum number of parts simply arranged.

Another important object of the invention is to provide a readily replaceable sleeve which is capable of being locked upon the crank shaft, wrist pin or other member on which it is mounted by a simple locking means, which is an integral part of the structure itself, and without the requirement of additional parts having a locking function only.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a side elevation of a portion of a connecting rod, partly in section, and a portion of a crank shaft equipped with the improved sleeve to which this invention relates.

Figure 2 is a transverse sectional view of the crank shaft, connecting rod, and sleeve shown in Figure 1.

Figure 3 comprises two sectional views showing the outer and inner surface of the sleeve.

Figure 4 is an end elevational view of the sleeve.

Referring to the drawing in detail, the invention embodies a hard-surface sleeve, comprising two identical sections 5. Each of the sections 5 is, in cross section, arcuate or semi-cylindrical in form, having a cylindrically shaped lug 6 on its inner face, situated intermediate its ends and at a short distance from one of its longitudinal edges. Each section 5 is in addition formed with a dovetail 7 situated intermediate its ends and extending from one longitudinal edge thereof, and a space or recess for receiving a dovetail 7 situated intermediate its ends along the other longitudinal edge, and with a slot 8 communicating with the inner side of said space or recess. Each section 5 is in addition formed with angled edges 11 along its longitudinal borders.

Sections 5 of the sleeve are positioned upon the outer surface of a crank or journal pin 9, extending between crank throws 12, which constitute enlarged portions at the ends of pin 9, by inserting the lugs 6 into lug sockets 10 provided for such purpose in the face of the pin 9.

When the sections 5 are properly positioned in this manner, the projection 7 extending from each section 5 enters the notch or space provided therefor in the other section and combines with the angled edges 11 and the entry of the lugs 6 into the sockets 10 to have the effect of holding the sleeve immovably in proper position.

Removal of the sleeve is accomplished by inserting the end of a screw driver or similar tool in the slot 8, and by exerting a prying motion thereon, the effect of which is to disengage the dovetail 7 adjacent the slot 8.

In the use of the invention, when a journal pin of a crank shaft becomes worn, particularly out of round, the shaft is turned down by suitable metal working tools.

Sections 5 of the sleeve are now positioned on the pin, the sections filling the space between the pin and babbitt bearing member of the connecting rod connected with the pin. Accurate fit is now provided between the pin and bearing of the connecting rod.

Attention is directed in particular to the fact pointed out above that sections 5 are identical, each section subtends an angle of 180 degrees plus the additional angle subtended by projection 7. Since the overall angular length of each section, including projection 7, is more than 180°, it follows that the sections have to be expanded slightly when put into place and will therefore be "latched" to the journal. The length of projection 7 determines the force required to remove a section after it has been put into place. By increasing the length of the projections the need of a dovetail interconnection can be dispensed with.

What is claimed is:

In a bearing construction having a journal pin or the like with enlarged portions at its ends which preclude endwise assembly of a bearing member thereon, and a split bearing surrounding said journal pin, the improvement which comprises; a replaceable two part sleeve disposed between the journal and bearing member, the parts of the sleeve being identical each part having free edges angularly disposed 180° apart and lying in substantially the same plane, edges of the parts being adapted to abut along straight lines diametrically opposite on the journal pin, each part of the sleeve having a tongue extension at one of its edges and a groove at the other, the tongue and groove being disposed centrally between the ends of the sleeve and shaped so that the tongue of one part fits the groove in the other, the total angular length of each part being in excess of 180 degrees and the thickness and resilience being such that the parts may be sprung over the journal pin into operative engagement, and means securing at least one of the parts to the journal pin preventing relative movement between the sleeve and journal pin.

JOHN A. RIORDAN.

REFERENCES CITED

The following references are of record in the file of this patent:

UNITED STATES PATENTS

| Number | Name | Date |
|---|---|---|
| 1,213,684 | Osterholm | Jan. 23, 1917 |
| 1,731,758 | Viden | Oct. 15, 1929 |
| 2,170,545 | Burton | Aug. 22, 1939 |